(12) United States Patent
Auer

(10) Patent No.: US 7,105,616 B2
(45) Date of Patent: Sep. 12, 2006

(54) SEPARATION OF ISOBUTENE NON-REACTED DURING POLYMERIZATION OF ISOBUTENE

(75) Inventor: Heinz Auer, Neulussheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 341 days.

(21) Appl. No.: 10/473,595

(22) PCT Filed: Apr. 10, 2002

(86) PCT No.: PCT/EP02/03999
§ 371 (c)(1),
(2), (4) Date: Oct. 10, 2003

(87) PCT Pub. No.: WO02/083745
PCT Pub. Date: Oct. 24, 2002

(65) Prior Publication Data
US 2004/0118788 A1 Jun. 24, 2004

(30) Foreign Application Priority Data
Apr. 11, 2001 (DE) .......................... 101 18 181

(51) Int. Cl.
C08F 4/06 (2006.01)

(52) U.S. Cl. ................. 526/133; 526/348.6; 526/348.7; 526/71

(58) Field of Classification Search ............. 526/71, 526/348.6, 348.7, 133
See application file for complete search history.

(56) References Cited

U.S. PATENT DOCUMENTS

| 3,280,091 | A | | 10/1966 | Dance et al. |
| 4,537,954 | A | | 8/1985 | Ando et al. |
| 5,216,121 | A | * | 6/1993 | Zanella et al. ............. 528/501 |
| 2004/0092707 | A1 | | 5/2004 | Wettling et al. |
| 2004/0198937 | A1 | * | 10/2004 | Auer et al. .................. 526/237 |

FOREIGN PATENT DOCUMENTS

| DE | 199 48 947 | 4/2001 |
| DE | 199 52 030 | 5/2001 |
| DE | 199 52 031 | 5/2001 |
| DE | 199 28 585 | 12/2001 |
| DE | 100 35 298 | 1/2002 |
| EP | 0 628 575 | 12/1994 |

OTHER PUBLICATIONS

Dr.–Ing Hermann Güterbock:"Polyisobutylen und Isobutylen–Mischpolymerisate", Springer–Verlag, pp. 77–104 1959.

* cited by examiner

Primary Examiner—William K. Cheung
(74) Attorney, Agent, or Firm—Oblon, Spivak, McClelland, Maier & Neustadt, P.C.

(57) ABSTRACT

A process for working up a liquid reaction discharge of the cationic polymerization of isobutene, which substantially comprises polyisobutene, unconverted isobutene and, if required, an inert diluent, is described. Problems with foam formation when the unconverted isobutene is being distilled off are avoided if the heated reaction discharge is let down into a flash container and/or not more than 900 $m^3/h$ of vapor are expelled per square meter of liquid surface and/or the resulting foam is destroyed, for example in a wet cyclone.

18 Claims, 1 Drawing Sheet

SEPARATION OF ISOBUTENE NON-REACTED DURING POLYMERIZATION OF ISOBUTENE

BACKGROUND OF THE INVENTION

1. Field of the Invention

The present invention relates to a process for working up a liquid reaction discharge of the cationic polymerization of isobutene, which substantially comprises polyisobutene, unconverted isobutene and, if desired, an inert diluent.

2. Description of the Background

High molecular weight polyisobutenes having molecular weights up to several 100,000 Dalton have long been known and their preparation is described, for example, in H. G üterbock: Polyisobutylen und Mischpolymerisate, pages 77–104, Springer, Berlin 1959. The highly reactive polyisobutenes which have a high content of terminal vinylidene groups, preferably substantially more than 60 mol %, must be distinguished from these conventional polyisobutenes. Highly reactive polyisobutenes are desirable intermediates for the preparation of additives for lubricants and fuels.

Such highly reactive polyisobutenes are obtainable, for example, by the process of EP 0 628 575, by cationic polymerization of isobutene in the liquid phase with the aid of boron trifluoride and a secondary alcohol at from 0 to −60° C.

The prior patent applications DE 199 48 947.5, DE 199 52 031.3, DE 199 52 030.5, DE 100 28 585.6 and DE 100 35 298.7 relate to improved or advantageous embodiments of such a process.

After the desired molecular weight has been reached, the reaction is stopped by deactivating the polymerization catalyst. The polymerization catalyst or its deactivation products is or are preferably removed by extraction with an aqueous solution. The unconverted isobutene, possibly together with part of the inert diluent, is then distilled off, the polyisobutene formed and the main amount of any inert diluent remaining behind. However, this distillation has the considerable problem that a bulky stubborn foam forms. As a result of the foam formation, the column used for the separation may be flooded and may no longer be able to perform its separation task. The production has to be stopped or the production rate reduced until the foam collapses under the action of gravitational force. However, the total capacity of a production plant is thus greatly restricted.

The cause of the foam formation is not exactly known. Usually, the formation of foams is observed in the case of amphiphilic molecules. However, polyisobutene and any diluent used have only hydrophobic groups but not hydrophilic groups. The use of chemical antifoams is not suitable since the polyisobutene is obtained as a distillation residue and the added antifoam would remain in the end product.

SUMMARY OF THE INVENTION

It is an object of the present invention to provide a process for working up a liquid reaction discharge of the cationic polymerization of isobutene, which process avoids the problems caused by the foam formation during the separation of the unconverted isobutene from the reaction discharge.

We have found that this object is achieved, according to the invention, by a process for working up a liquid reaction discharge of the cationic polymerization of isobutene, which substantially comprises polyisobutene, unconverted isobutene and, if required, an inert diluent, in which the vapor phase containing unconverted isobutene is separated from the reaction discharge by a) heating the reaction discharge and letting it down into a flash container, the reaction discharge separating into a polyisobutene-containing liquid phase and a vapor phase as a result of the flashing; and/or b) heating the reaction discharge and/or the liquid phase obtained in step a) so that not more than 900 m$^3$/h of vapor are expelled per square meter of liquid surface; and/or c) foam formed during the evaporation is passed toward an impact surface or is caused to flow along a circular path so that the foam is separated into a gaseous fraction and a liquid fraction.

DETAILED DESCRIPTION OF THE PREFERRED EMBODIMENTS

Figure 1:
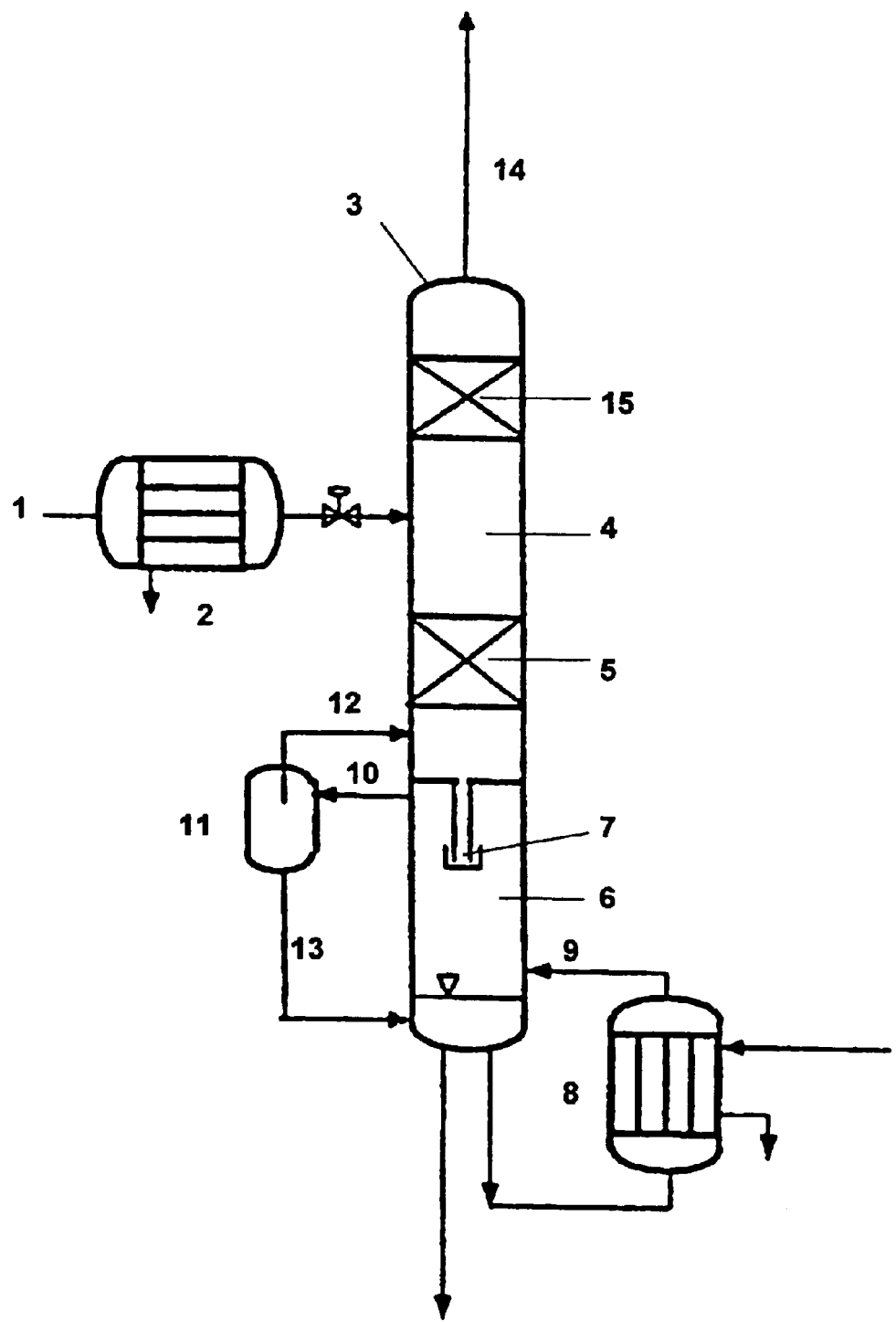
FIG. 1 shows an apparatus embodiment by which the work-up of the cationic polymerization of isobutene is conducted using a flash apparatus.

The novel process makes use of at least one of the above measures a), b) and c). Embodiments which make use of the measures a) and b) or of the measures a) and c) are particularly preferred.

If the liquid reaction discharge is heated until the unconverted isobutene is expelled by evaporation, the isobutene must overcome the liquid-gas boundary when passing over into the gas phase. During this procedure, a thin skin of liquid may form around a small gas bubble. If the liquid has a high film formation capacity, very stable foams are obtained and lead to the abovementioned problems. According to the measure a) of the novel process, the reaction discharge is heated and is let down into a flash container. Here, the resulting vapor phase need not overcome the liquid-gas boundary, so that there is no danger of foam formation.

The reaction discharge in which the polymerization catalyst has been deactivated and/or from which the polymerization catalyst or its deactivation products has or have preferably been removed, as described in detail further below, is heated preferably to a temperature of from 40 to 200° C., in particular from 40 to 140° C., particularly preferably from 40 to 120° C., for example in a heat exchanger. During this procedure, the reaction discharge is under a pressure which as a rule corresponds to that of the polymerization system and is, for example, from 2 to 30, preferably from 2 to 20, bar. The heated reaction discharge is then let down into a flash container which is under a pressure of, in general, from 1 to 10, preferably from 1 to 8, particularly preferably from 1 to 5, bar. The pressure difference in the flashing is preferably at least 1, in particular at least 3, bar.

As a result of the flashing, the reaction discharge separates into a liquid phase containing the polyisobutene and any diluent and a vapor phase which contains the main amount of the isobutene contained in the reaction discharge. The temperature to which the reaction discharge is preheated and the pressure difference in the flashing are preferably chosen so that the vapor phase contains at least 50%, in particular at least 70%, of the isobutene contained in the reaction discharge. Suitable combinations of temperature difference and pressure difference can be readily estimated by a person skilled in the art on the basis of the known values of the specific heat capacity of polyisobutene, isobutene and any diluent present and the specific enthalpy of vaporization of isobutene, or alternatively can be determined by simple experiments.

The design of the flash container is not subject to any substantial restrictions. Preferably, the heated reaction discharge is introduced into the flash container in such a way that a large liquid surface which favors the expulsion of the gas phase from the liquid phase is generated on entry into the container. It has proven advantageous for this purpose to use a preferably elongated, vertically arranged flash container having a circular cross section and to introduce the heated reaction discharge tangentially to the wall of the flash container, preferably in a direction perpendicular to the longitudinal axis of the flash container. In this way, the reaction discharge flows along the container wall and follows this curvature, with the result that the reaction discharge experiences a torsion and moves downward in the flash container spirally along the circumference of the container wall.

A preferably used flash container is a column, the heated reaction discharge being fed laterally into a column region free of internals, preferably in the region of the middle of the column or in the upper region of the column. The resulting liquid phase is suitably passed over internals having separation activity in the lower region of the column used as the flash container, in order to create a very large phase interface and to complete the expulsion of the gas phase. For example, bubble trays and, preferably, a packing are suitable as internals having separation activity.

It was furthermore found that the foam formation can be greatly suppressed or avoided if the reaction discharge and/or the liquid phase obtained in step a) is heated so that not more than 900, preferably not more than 500, in particular not more than 300, particularly preferably not more than 100, m$^3$/h are expelled as vapor per m$^2$ of liquid surface. In the case of said evaporation quantities, the probability that small gas bubbles will be enclosed by a skin of liquid on passing through the liquid-phase interface is low, and spontaneously formed foam rapidly collapses under the action of gravitational force. The treatment of the reaction discharge in this way does however require evaporators having a large liquid surface or is restricted to very low throughputs. Working-up of the complete reaction discharge by the isolated use of measure b) is therefore less preferable. Measure b) is preferably used for completing the evaporation of the unconverted isobutene from the liquid phase obtained in step a), from which the main amount of unconverted isobutene has already been removed by flashing.

The evaporation quantity per m$^2$ of liquid surface can be particularly readily determined if an external evaporator is used for heating. The liquid surface available for expulsion of vapor is a characteristic of the respective evaporator. The evaporation quantity can be estimated on the basis of the power consumption of the evaporator and the specific enthalpy of vaporization of isobutene. Alternatively, the liquid surface available for vaporization can be estimated, for example in the case of installed evaporators, on the basis of geometric measurement.

On the other hand, unconvertd isobutene can be expelled from the reaction discharge or from the liquid phase obtained in step a) with a relatively high evaporation power and the foam formed can be separated according to measure c) into a gaseous fraction and a liquid fraction by passing it toward an impact surface or causing it to flow along a circular path. If the foam is passed at sufficiently high velocity toward an impact surface, the micelles of the foam are compressed and destroyed, with the result that the foam disintegrates into a gaseous fraction and a liquid fraction. If the foam is caused to flow along a circular path, the micelles are destroyed by the action of centrifugal forces, in particular in contact with a container wall, with the result that the foam likewise disintegrates into a gaseous fraction and a liquid fraction. Expediently, the foam is caused to flow along a circular path by passing it tangentially into a container having a circular cross section. In a preferred embodiment, a wet cyclone is used as the container having a circular cross section. Said cyclone is distinguished by the fact that high centrifugal accelerations are achieved, which result in effective separation of the foam into a liquid fraction and a gaseous fraction. When such a wet cyclone is used, these centrifugal forces are applied by the kinetic energy of the flow. It has proven advantageous to pass the foam at a velocity of from about 5 to 30 m/s into the container having a circular cross section or into the wet cyclone. Alternatively, the foam can also be caused to flow along a circular path by applying mechanical energy, for example by means of rotating disks and the like.

In a particularly preferred embodiment of the novel process, a flash container having an upper compartment and a lower compartment which are connected to one another via a siphon is provided;

the heated reaction discharge is let down into the upper compartment;

the resulting vapor phase is taken off from the upper compartment and the resulting liquid phase is passed into the lower compartment;

the liquid phase present in the lower compartment is heated to evaporate the remaining isobutene;

the resulting foam is taken off from the lower compartment and is passed toward an impact surface or caused to flow along a circular path so that the foam is separated into a gaseous fraction and a liquid fraction, and the gaseous fraction is passed into the upper compartment and the liquid fraction is passed into the lower compartment.

A suitable siphon is a S-shaped pipe which connects the upper and the lower compartments, or a pipe connecting piece which leads downward from the upper compartment and ends below a liquid surface of the liquid phase. The siphon makes it possible for the liquid phase forming during flashing to pass from the upper compartment into the lower compartment and prevents the foam formed during expulsion of the remaining isobutene in vapor form from moving from the lower compartment into the upper compartment.

The liquid phase obtained by the novel process is further worked up in a manner known per se, for example is freed from any diluent still present by distillation.

The cationic polymerization of isobutene in the presence of a Lewis acid catalyst can be carried out continuously or batchwise but is preferably effected continuously. Processes for the continuous polymerization in the liquid organic phase are known per se. In the continuous process, a part of the reaction mixture formed in the polymerization reactor is discharged continuously. An amount of starting materials, in this case isobutene or isobutene-containing feed, which corresponds to the discharge is fed continuously to the polymerization reactor. The ratio of the amount of substance present in the polymerization reactor to the amount which is discharged is determined by the circulation/feed ratio, which, in the continuous polymerization of isobutene to polyisobutene, is as a rule from 1,000:1 to 1:1, preferably from 500:1 to 5:1, in particular from 200:1 to 30:1. The average residence time of the isobutene to be polymerized in the polymerization reactor may be from five seconds to several hours. Residence times of from 1 to 30, in particular from 2 to 20, minutes are particularly preferred.

The polymerization of the isobutene is carried out in the conventional reactors, such as stirred kettles, tubular reactors, tube-bundle reactors and loop reactors, loop reactors, i.e. tubular or tube-bundle reactors having stirred kettle characteristics, being preferred. Tubular reactors having tube cross sections which lead to turbulence in segments are particularly advantageous.

The polymerization is usually carried out at a reaction temperature of from −60 to +40° C., in particular from −30 to 0° C., particularly preferably from −25 to −5° C. The heat of polymerization is accordingly removed with the aid of a cooling apparatus. This can be operated, for example, using liquid ammonia as a coolant. Another possibility for removing the heat of polymerization is evaporative cooling. Here, the heat liberated is removed by partial evaporation of the reaction mixture, for example of the isobutene and/or other readily volatile components of the isobutene feed or of a readily volatile diluent. Isothermal conditions are preferably employed, i.e. the temperature of the liquid organic reaction phase in the polymerization reactor has a constant value and changes only slightly, if at all, during the operation of the reactor.

The concentration of the isobutene in the liquid reaction phase is as a rule from 0.2 to 50, preferably from 0.5 to 20, % by weight, based on the liquid organic phase.

Suitable starting materials are both isobutene itself and isobutene-containing $C_4$-hydrocarbon streams, for example refined $C_4$ fractions, $C_4$ cuts from isobutane dehydrogenation, $C_4$ cuts from steam crackers or FCC crackers (fluid catalyzed cracking), provided that they have been substantially freed from 1,3-butadiene contained therein. Suitable $C_4$-hydrocarbon streams contain, as a rule, less than 500 ppm, preferably less than 200 ppm, of butadiene. The presence of 1-butene, cis-2-butene and trans-2-butene is substantially uncritical. Typically, the isobutene concentration in the $C_4$-hydrocarbon streams is from 40 to 60% by weight. When $C_4$ cuts are used as starting material, the hydrocarbons other than isobutene play the role of an inert diluent. The isobutene-containing feed may contain small amounts of contaminants, such as water, carboxylic acids or mineral acids, without there being critical decreases in yield or selectivity. It is expedient to avoid an enrichment of these impurities by removing such pollutants from the isobutene-containing feed, for example by adsorption on solid adsorbents, such as active carbon, molecular sieves or ion exchangers.

Suitable diluents are those solvents or solvent mixtures which are inert under the reaction conditions to the reagents used. Suitable diluents are, for example, saturated hydrocarbons, such as butane, pentane, hexane, heptane, octane, e.g. n-hexane or isooctane, or cyclopentane, halogenated hydrocarbons, such as methyl chloride, dichloromethane or trichloromethane, and mixtures of the above-mentioned diluents, among which n-hexane is particularly preferred. Before they are used, the diluents are preferably freed from impurities, such as water, carboxylic acids or mineral acids, for example by adsorption on solid adsorbents, such as active carbon, molecular sieves or ion exchangers.

It is advantageous for the removal of the heat of reaction to employ a high dilution, i.e. a large amount of diluent in the reaction mixture. On the other hand, a large amount of diluent decreases the amount of polyisobutene obtainable per reactor volume and adversely affects the cost efficiency of the process. In practice, a compromise is therefore made between high utilization of reactor volume and—for removal of the heat of reaction—a sufficiently low viscosity at the reaction temperature. The optimum amount of diluent can be determined by a person skilled in the art in a simple manner, by reducing the amount of diluent in the reaction mixture until just before the point at which the heat of reaction can no longer be removed rapidly enough. A temperature increase in the reactor and possibly an incipient deterioration in the product quality indicate that the amount of diluent has fallen below the optimum amount.

A particularly preferred Lewis acid catalyst is boron trifluoride, preferably in combination with a cocatalyst. Boron trifluoride is expediently used in the form of gaseous boron trifluoride, it being possible to use technical-grade boron trifluoride still containing small amounts of sulfur dioxide and $SiF_4$, but high-purity boron trifluoride having a purity of about 99.5% by weight is preferably used.

Suitable cocatalysts are as a rule oxygen-containing compounds which preferably contain at least one divalent oxygen atom. Suitable oxygen-containing compounds in addition to water are organic compounds of up to 30 carbon atoms. Examples of these are $C_1$–$C_{30}$-alkanols, $C_1$–$C_{30}$-cycloalkanols, $C_2$–$C_{10}$-diols, $C_1$–$C_{20}$-carboxylic acids, $C_4$–$C_{12}$-carboxylic anhydrides and $C_2$–$C_{20}$-dialkyl ethers. Preferred among these are monohydric alkanols of 1 to 20, in particular 1 to 4, carbon atoms, which, if required, may be used together with the $C_2$–$C_{20}$-dialkyl ethers. Particularly preferred cocatalysts are monohydric secondary $C_3$–$C_{20}$-alkanols and tert-butyl ether. Examples are isopropanol, 2-butanol, sec-pentanol, sec-hexanol, sec-heptanol, sec-octanol and the like. 2-Butanol, isopropanol, methyl tert-butyl ether, ethyl tert-butyl ether and isopropyl tert-butyl ether are particularly preferably used.

The molar ratio of boron trifluoride to cocatalyst is preferably from 1:1 to 1:10, in particular from 1:1.1 to 1:5, particularly preferably from 1:1.2 to 1:2.5. The boron trifluoride and the cocatalyst can be reacted beforehand with formation of a complex or can be combined in situ in the reaction mixture.

The concentration of the combination of boron trifluoride and cocatalyst in the reactor is as a rule from 0.005 to 1, in particular from 0.01 to 0.7, particularly preferably from 0.015 to 0.5, % by weight, based on the liquid organic phase.

After the desired degree of polymerization has been reached, the catalyst is separated off or deactivated and the polymerization is stopped in this way. For catalyst deactivation, it is possible to use deactivators, for example water, alcohols, acetonitrile, ammonia or aqueous solutions of mineral bases or carbonates, which are added to the reaction mixture. Acidified aqueous solutions may also be used for this purpose. Instead of quantitatively deactivating the catalyst in the reaction mixture, it can either be quantitatively separated from the reaction mixture or some of it can be separated from the reaction mixture and the remaining catalyst deactivated in the reaction mixture. The removal of the catalyst is advantageously effected according to the description of WO 99/31151.

For the separation of the catalyst from the reaction mixture, it is advisable to reduce the isobutene concentration beforehand to less than 2, preferably less than 1, in particular less than 0.5, % by weight, based on the reaction mixture. Separating off the catalyst, soluble boron trifluoride complex catalysts having limited solubility in the reaction mixture are preferably used and/or the reaction mixture is cooled to temperatures of, for example, from 5 to 30, preferably from 10 to 20, Kelvin below the reaction temperature.

In the further course of the working-up, the reaction discharge is expediently subjected to one or more extractions—usually with water—for removing residual amounts of catalyst. The organic phase obtained after the extraction is particularly suitable as the starting material for the novel process.

The isobutene polymer has, as a rule, a number average molecular eight Mn of from 500 to 50,000 and a content of terminal vinylidene groups of more than 60, in particular more than 80, mol %. The dispersity $M_w/M_n$ is preferably not more than 1.9, in particular not more than 1.8.

THE DESCRIPTION OF THE DRAWING

The present invention is illustrated in more detail by the attached FIGURE.

FIG. 1 schematically shows a plant suitable for carrying out the novel process. The liquid reaction discharge is passed via the line 1 and the heat exchanger 2 into the upper compartment 4 of a flash container 3. As a result of the flashing, the reaction discharge separates into a vapor phase and a liquid phase. The liquid phase passes through the packing 5 via the siphon 7 into the lower compartment 6 of the flash container 3. The liquid phase collecting in the compartment 6 is heated by circulation via the heater 8 and is passed back into the compartment 6 via line 9. The foam formed on expulsion of the remaining isobutene in vapor form is fed via line 10 to a wet cyclone 11, where the foam is separated into a gaseous fraction, which is recycled into the compartment 4 of the flash container 3 via line 12, and a liquid fraction, which is fed into the lower compartment 6 of the flash container 3 via line 13. The gas phase is taken off from the upper compartment 4 of the flash container 3 via the line 14. The mist separator 15 prevents droplets of the liquid phase from being entrained.

We claim:

1. A process for working-up the liquid reaction material discharged from an isobutene polymerization reactor in which isobutene is subject to cationic polymerization, comprising:
    separating said discharged liquid reaction material comprising polyisobutene, unconverted isobutene and optionally an inert diluent from a vapor phase material that comprises unconverted isobutene by:
    (a) heating said discharged liquid reaction material and passing it down into a flash container, whereby separation of material occurs into a polyisobutene-containing liquid phase and a vapor phase; and
    (b) passing foam that is formed as a result of the evaporation of said vapor phase material toward an impact surface or causing the foam to flow along a circular path so that the foam separates into a vapor fraction and a liquid fraction.

2. The process as claimed in claim 1, which comprises heating the liquid phase obtained upon flashing so that no more than 900 m³/h of vapor is expelled per square meter of liquid surface.

3. The process as claimed in claim 1, wherein
    (i) said flash container has an upper compartment and a lower compartment which are connected to one another via a siphon;
    (ii) the heated reaction discharge is let down into the upper compartment;
    (iii) the resulting vapor phase is removed from the upper compartment and the resulting liquid phase is passed into the lower compartment;
    (iv) the liquid phase present in the lower compartment is heated to evaporate the remaining isobutene;
    (v) the resulting foam is removed from the lower compartment and is passed toward an impact surface or caused to flow along a circular path so that the foam is separated into a gaseous fraction and a liquid fraction; and
    (vi) the gaseous fraction is passed into the upper compartment and the liquid fraction is passed into the lower compartment.

4. The process as claimed in claim 1, which comprises tangentially introducing the liquid reaction material discharged from the polymerization reactor into a flash container having a circular cross-section.

5. The process as claimed in claim 1, wherein the foam is caused to flow along a circular path by passing it tangentially into a container having a circular cross-section.

6. The process as claimed in claim 1, wherein the foam is caused to flow along a circular path by passing it tangentially into a container having a circular cross-section.

7. The process as claimed in claim 6, wherein the foam is passed at a velocity ranging from 5 to 30 m/s into said container.

8. The process as claimed in claim 6, wherein the container having a circular cross-section is a wet cyclone.

9. The process as claimed in claim 1, wherein the liquid reaction material discharged from the isobutene polymerization reactor is heated to a temperature ranging from 40 to 200° C. under the pressure of the polymerization reaction system which ranges from 2 to 30 bar.

10. The process as claimed in claim 1, wherein the vapor phase obtained upon flashing contains at least 50% of the isobutene that is present in the liquid reaction material discharged from the isobutene polymerization reactor.

11. The process as claimed in claim 10, wherein the vapor phase obtained upon flashing contains at least 70% of the isobutene that is present in the liquid reaction material discharged from the isobutene polymerization reactor.

12. The process as claimed in claim 2, wherein
    (i) said flash container has an upper compartment and a lower compartment which are connected to one another via a siphon;
    (ii) the heated reaction discharge is let down into the upper compartment;
    (iii) the resulting vapor phase is removed from the upper compartment and the resulting liquid phase is passed into the lower compartment;
    (iv) the liquid phase present in the lower compartment is heated to evaporate the remaining isobutene;
    (v) the resulting foam is removed from the lower compartment and is passed toward an impact surface or caused to flow along a circular path so that the foam is separated into a gaseous fraction and a liquid fraction; and
    (vi) the gaseous fraction is passed into the upper compartment and the liquid fraction is passed into the lower compartment.

13. The process as claimed in claim 2, which comprises tangentially introducing the liquid reaction material discharged from the polymerization reactor into a flash container having a circular cross-section.

14. The process as claimed in claim 2, wherein the foam is caused to flow along a circular path by passing it tangentially into a container having a circular cross-section.

15. The process as claimed in claim 12, wherein the foam is passed at a velocity ranging from 5 to 30 m/s into said container.

16. The process as claimed in claim 2, wherein the liquid reaction material discharged from the isobutene polymerization reactor is heated to a temperature ranging from 40 to 200° C. under the pressure of the polymerization reaction system which ranges from 2 to 30 bar.

17. The process as claimed in claim 2, wherein the vapor phase obtained upon flashing contains at least 50% of the isobutene that is present in the liquid reaction material discharged from the isobutene polymerization reactor.

18. The process as claimed in claim 17, wherein the vapor phase obtained upon flashing contains at least 70% of the isobutene that is present in the liquid reaction material discharged from the isobutene polymerization reactor.

* * * * *